(12) United States Patent
MacKarvich

(10) Patent No.: US 6,581,952 B1
(45) Date of Patent: Jun. 24, 2003

(54) TRAILER HITCH COVER WITH RETRACTABLE SAFETY CABLES

(76) Inventor: Charles J. MacKarvich, 3940 Paces Manor Dr., Atlanta, GA (US) 30339

( * ) Notice: Subject to any disclaimer, the term of this patent is extended or adjusted under 35 U.S.C. 154(b) by 0 days.

(21) Appl. No.: 10/135,155

(22) Filed: Apr. 29, 2002

Related U.S. Application Data

(60) Provisional application No. 60/351,604, filed on Jan. 25, 2002.

(51) Int. Cl.[7] .................................................. B60D 1/28
(52) U.S. Cl. ...................................... 280/457; 280/507
(58) Field of Search ............................... 280/456.1, 457, 280/504, 507, 511, 480, 480.1

(56) References Cited

U.S. PATENT DOCUMENTS

| | | | | |
|---|---|---|---|---|
| 3,724,875 A | * | 4/1973 | Hillman | 280/457 |
| 3,873,131 A | * | 3/1975 | Adams | 280/456.1 |
| 4,017,977 A | * | 4/1977 | Light et al. | 33/1 LE |
| 4,718,690 A | * | 1/1988 | Baker | 280/480 |
| 5,072,964 A | * | 12/1991 | Schule | 280/457 |

* cited by examiner

*Primary Examiner*—Kevin Hurley
(74) *Attorney, Agent, or Firm*—Thomas, Kayden, Horstemeyer & Risley

(57) ABSTRACT

The trailer hitch has a pair of tubular housings 22 and 23, a coil compression spring 29 in each housing, and a cable 30 or 31. Each cable is telescopically slidable with respect to its housing, through its spring 29, and its proximal end 45 is connected to the inner end of the spring by the cable/spring connector 32. When the hooks 49 at the distal ends of the cables 30 or 31 are disconnected from the towing vehicle, the springs urge the cables into the housings.

7 Claims, 4 Drawing Sheets

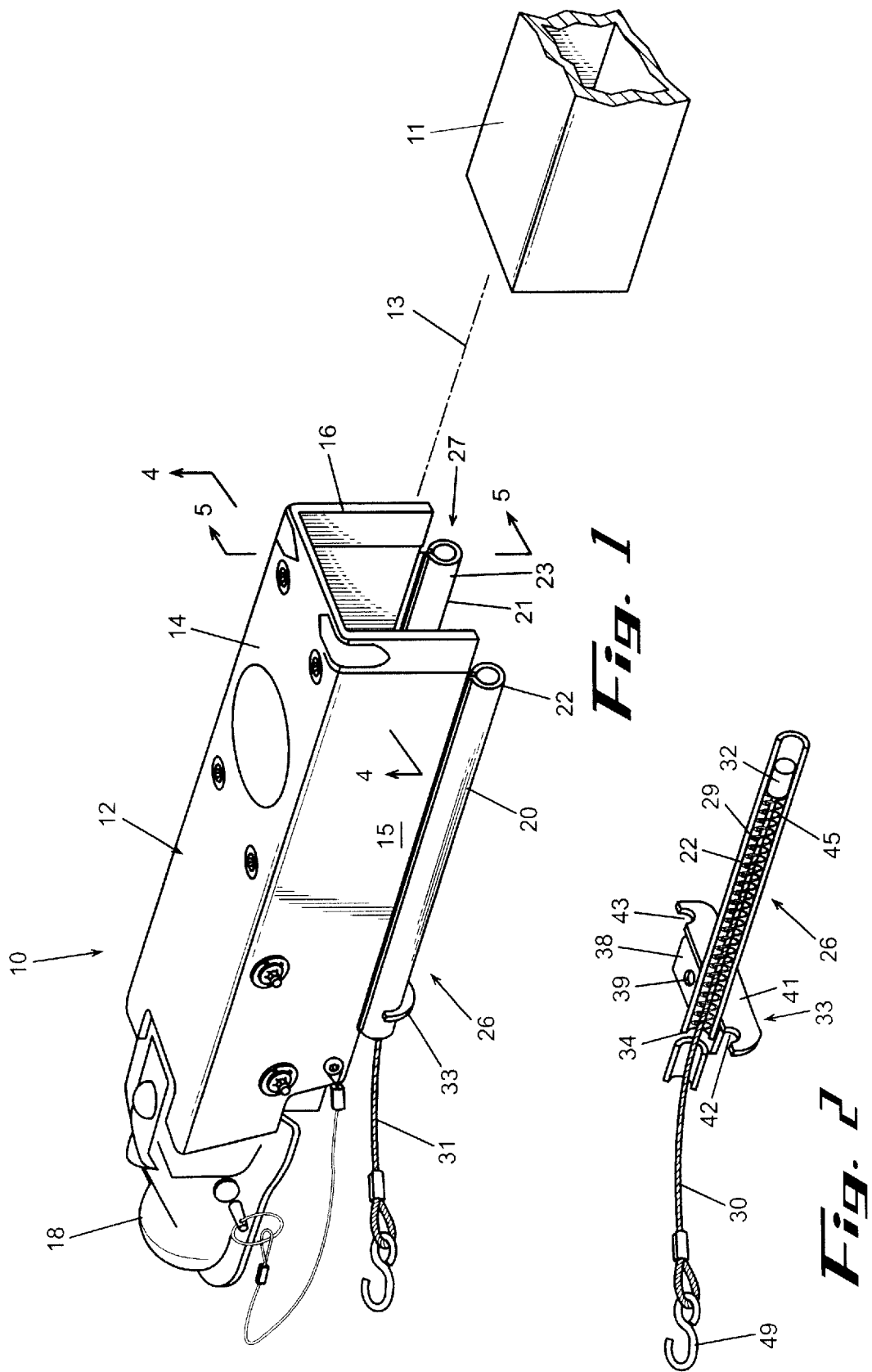

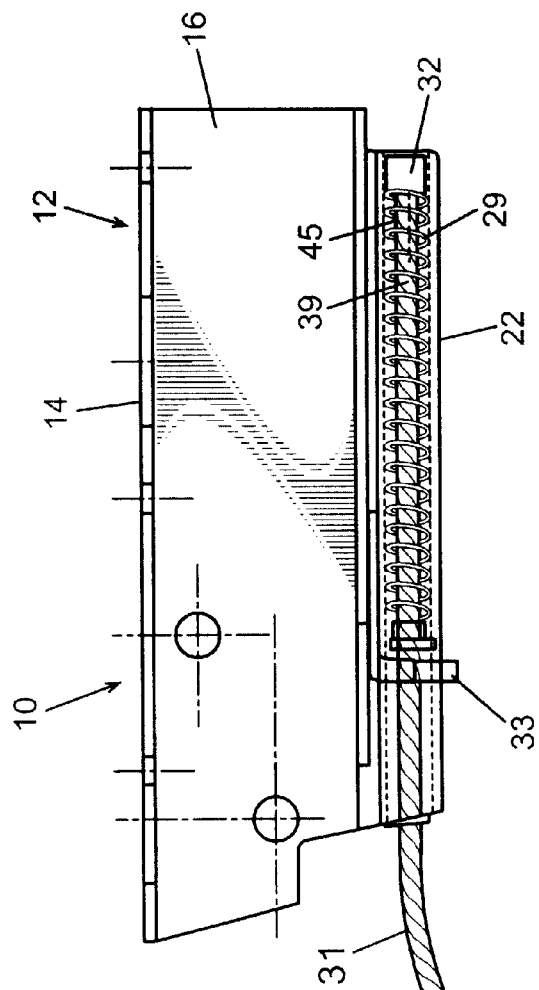
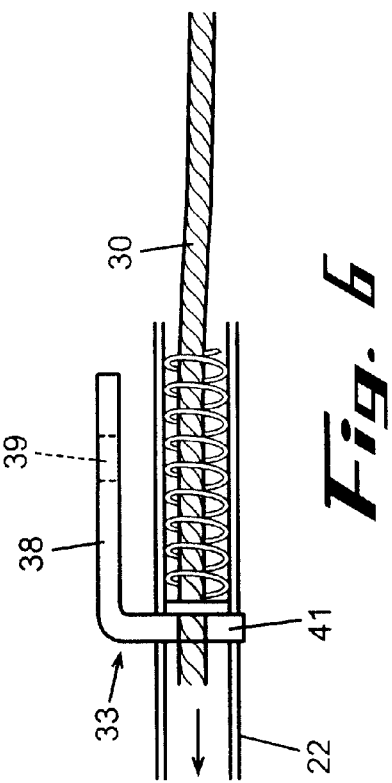

TRAILER HITCH COVER WITH RETRACTABLE SAFETY CABLES

CROSS REFERENCE

Applicant claims the benefit of U.S. Provisional Patent Application 60/351,604, filed in the U.S. Patent and Trademark Office on Jan. 25, 2002.

FIELD OF THE INVENTION

This invention includes a hitch ball coupler for a trailer that is connected to a ball hitch of a towing vehicle. More particularly, the invention includes a trailer hitch coupler for connection to the ball of a ball hitch of a towing vehicle, with the coupler having retractable safety cables that can retract when the trailer is not connected to the towing vehicle.

BACKGROUND OF THE INVENTION

This invention involves a hitch ball coupler of a trailer that is to be connected to the ball hitch of a towing vehicle. Prior art trailers typically include a hitch ball coupler that couples directly to the ball hitch of the towing vehicle and a pair of safety chains or cables that extend from the trailer to the ball hitch or to the vehicle itself. The purpose of the safety chains is to make sure that the trailer does not accidentally separate from the towing vehicle in the event of the separation of the hitch ball coupler from the ball hitch of the towing vehicle.

The safety chains and cables are considered by most people to be obnoxious and unsightly, although they are necessary for safety purposes. The chains tend to droop from the trailer toward the towing vehicle when the trailer is mounted to the towing vehicle, or droop from the trailer to the ground when the trailer is disconnected from the towing vehicle.

In addition to the unsightliness, when the trailer is moved away from the towing vehicle, the safety chains that are not connected to the ball hitch have the hazard of dragging on the ground, or obstructing the movement of personnel or equipment about the trailer tongue.

It is to these problems that this invention is devoted.

SUMMARY OF THE INVENTION

Briefly described, the present invention comprises a hitch ball coupler assembly for a trailer that is to be connected to a ball hitch of a towing vehicle, whereby the conventional safety chains or cables of the coupler are replaced with retractable safety cables that can be distended for connection to the ball hitch and retracted for compact and visually pleasing storage. The coupler assembly includes a pair of retractable cable assemblies, each including a housing and a cable and a spring supported in the housing. Each housing has an opening that is adjacent the ball coupler. The cable has its proximal end received in its housing and its distal end configured to connect to the ball hitch. The spring is also mounted to the housing that is operatively connected to the proximal end of the cable for biasing the cable into the housing.

In a preferred embodiment of the invention, the housing of each retractable cable assembly comprises a rectilinear tube, and the spring is a compression spring that is mounted in the tube with one of its ends anchored within the tube. The other end of the spring is connected to the proximal end of the cable, and as the cable is withdrawn from the tube, the spring compresses to bias the cable back into the tube.

The retractable cable assemblies are neat and streamlined in appearance, and are inexpensive to construct.

The hitch ball coupler typically includes an elongated cover that is U-shaped in cross section with a base wall and opposed parallel sidewalls for extending about the draw bar of a trailer. The tubular housings of the retractable cable assemblies are formed at the edge portions of the U-shaped cover, so that the cover and the tubular housings are made of one piece of material.

The dimensions of each tubular housing are formed so that the spring inserted therein is a coil compression spring, with one end of the spring anchored to the housing and the other end of the spring being slidably movable along the interior of the tubular housing. The proximal end of the cable is telescopically threaded through the anchored end of the coil compression spring, reaching the free end of the spring, with a cable/spring connector connecting the proximal end of the cable and the free end of the spring. With this arrangement, when the cable is pulled out of the tubular housing, the cable tends to compress the spring, while the spring tends to bias the cable to its return position.

Because of the continuous bias of the cable into the tubular housing, there will normally be no slack in the cable as it extends from the tubular housing to the ball hitch. Also, as the trailer and towing vehicle pivot, as when the trailer is being driven around a curve or being moved rearwardly at an angle with respect to the towing vehicle, the springs will allow more or less of the cable to extend from the tubular housings so as to compensate for the greater or shorter distances created between the tubular housings and the point of connection of the cable to the ball hitch.

Thus, it is an object of this invention to provide an improved hitch ball coupler for a draw bar of a trailer or other towed vehicle, for connection to the ball hitch of a towing vehicle, whereby safety cables are provided that distend and retract in response to being connected to or disconnected from the ball hitch of the towing vehicle.

Another object of this invention is to provide an improved trailer hitch cover formed of a single piece of material, which includes a pair of tubular housings for mounting retractable safety cables that extend from the cover to the ball hitch of a towing vehicle.

Other objects, features and advantages of this invention will become apparent upon reading the following specification, when taken in conjunction with the accompanying drawings.

BRIEF DESCRIPTION OF THE DRAWINGS

FIG. 1 is a perspective view of the hitch ball coupler.

FIG. 2 is a perspective view, in cross section, of a spring tubular housing of the hitch ball coupler.

FIG. 5 is a side view, in cross section, of the hitch ball coupler, taken along lines 5—5 of FIG. 1.

FIG. 6 is a side view of a portion of a tubular housing and of the cable retaining bracket.

DETAILED DESCRIPTION

Figure 3:
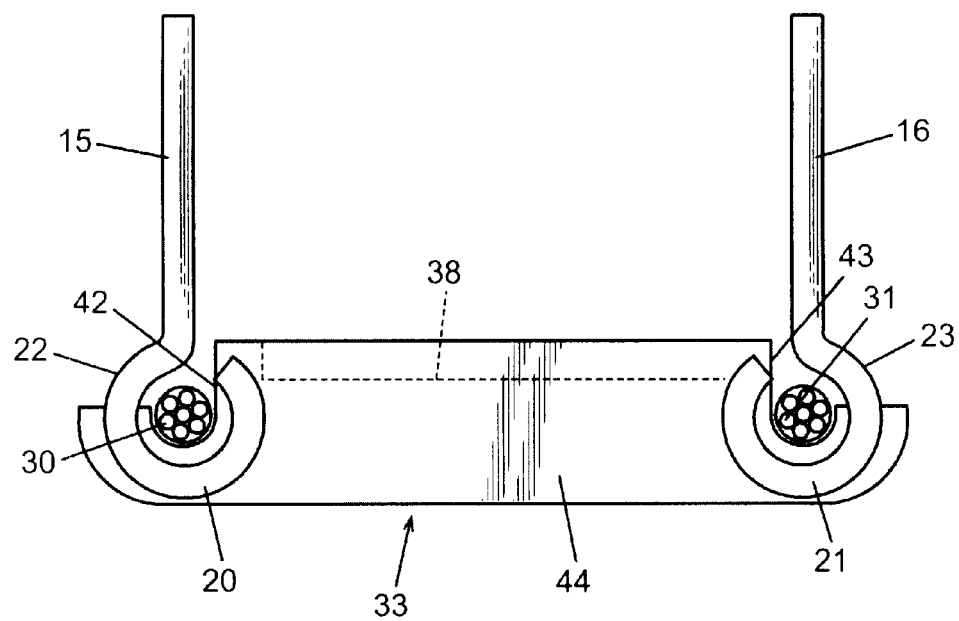
FIG. 3 is an elevational view of the cable restraining bracket, showing how the bracket engages through the spring tubular housing with the end of the spring and about the cable.
Figure 4:
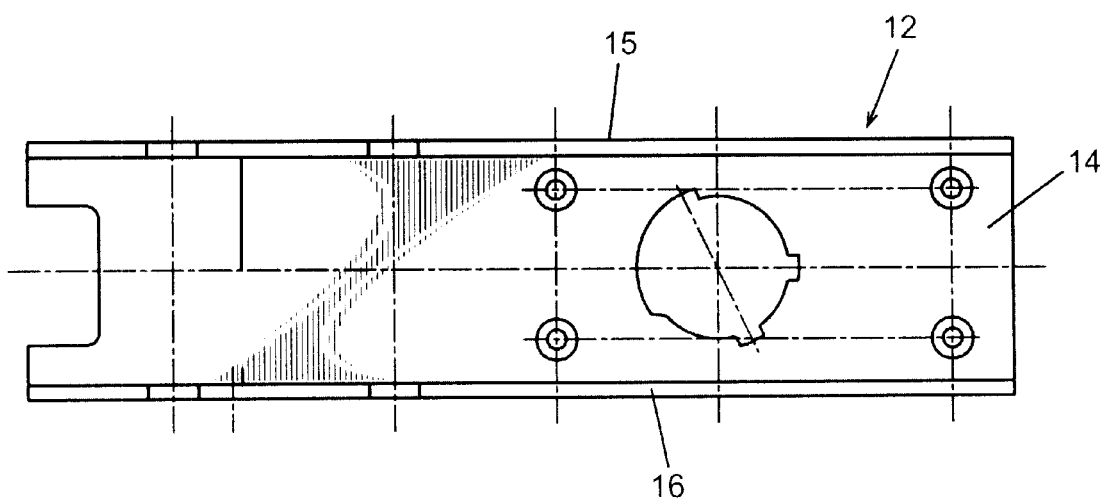
FIG. 4 is a cross sectional view of the cover of the hitch ball coupler, taken along lines 4—4 of FIG. 1.
Figure 7:
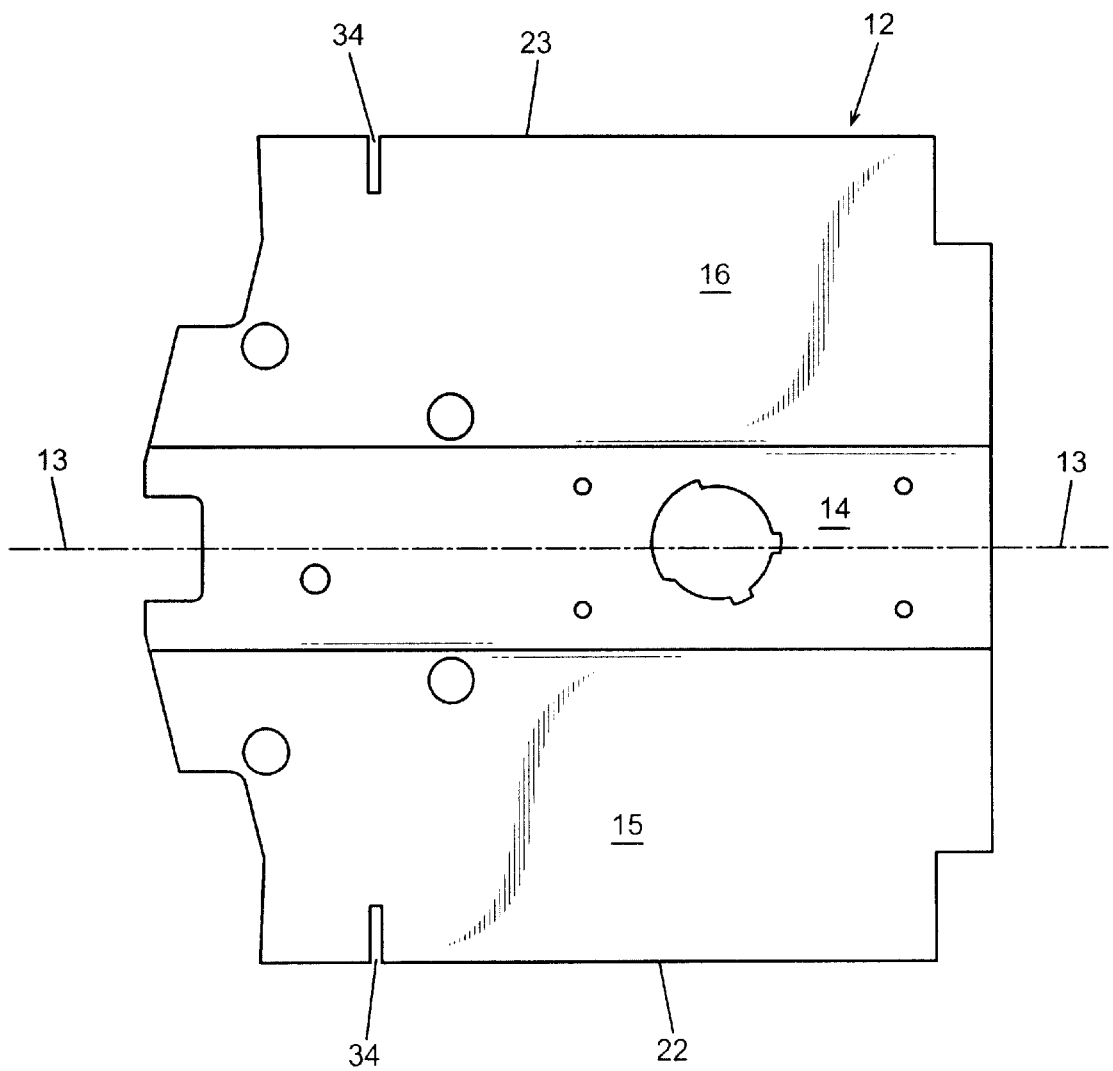
FIG. 7 is a layout of the cover for the hitch ball coupler.

Referring now in more detail to the drawings in which like numerals indicate like parts throughout the several views, FIG. 1 illustrates a hitch ball coupler 10 of the type that is to be mounted to a conventional ball hitch (not shown) of a towing vehicle. The hitch ball coupler is to be mounted to the draw bar 11 of a trailer, the type that hauls boats or other heavy objects.

The hitch ball coupler includes an elongated cover 12 having a longitudinal axis 13. The cover 12 is of an inverted U-shape and includes a base or top wall 14 and opposed, downwardly extending parallel sidewalls 15 and 16. This U-shaped configuration is dimensioned so as to fit about the draw bar 11 of the trailer and for supporting the ball receptacle 18 that is to be mounted to the ball of a ball hitch of a towing vehicle.

The elongated cover 12 includes lower edge portions 20 and 21 and tubular housings 22 and 23 are formed along the lower edge portions. The tubular housings are rectilinear and are oriented parallel to each other and parallel to the longitudinal axis 13.

The tubular housings 22 and 23 each form a part of retractable cable assemblies 26 and 27. The cable assemblies 26 and 27 each include a coil compression spring 29, a safety cable 30 or 31, and a spring/cable connector 32 that connects the second end of the spring to the proximal end 45 of the cable. A slot 34 is formed in each tubular housing, and the common cable retaining bracket 33 extends through both slots so as to anchor the first end of the spring to the tubular housing to prevent the proximal end of the cable from moving out of the open end of the tubular housing.

The cable retaining bracket 33 includes a support platform 38 having mounting screw openings 39 formed therein, and a spring retaining plate 41 extending at a right angle with respect to the support platform 38. Cable notches 42 and 43 are formed in spring retaining plate 41. The cable notches 42 and 43 are sized so as to surround cables 30 and 31, but are small enough so as to obstruct the movement of coil compression spring 29 out of the end of the tubular housing 22. A support strap (not shown) is rigidly connected to the lower edge portions 20 and 21 of the cover 12, for supporting the cable retaining bracket. A connector bolt (not shown) is extended through the screw openings 39 for connecting the cable retaining bracket to the support strap extending across the bottom of the cover 12.

When the trailer is not connected to a towing vehicle, the safety cables 30 and 31 will be retracted into their respective housings by the proximal end 45 of each cable being urged by the coil compression spring 39 to the rear of the respective tubular housings 22, 23. This causes the distal end 46 of the cable to be pulled closer to the tubular housing 22, 23, as illustrated in FIG. 5.

When the hitch ball coupler 10 is mounted to the ball hitch of a towing vehicle, the operator will pull the distal ends 46 of the safety cables 30 and 31 toward the ball hitch or toward the vehicle and connect the hooks 49 at the distal ends of the cables to the vehicle. As the distal ends are pulled by the operator, the proximal ends 45 of the cables will move toward the cable retaining bracket 33, compressing the spring 29. Once the hooks 49 of the cables are connected to the vehicle and the distal ends of the cables are released, the spring will pull the cables taut, so that the cables extend from the towing vehicle directly back to the tubular housings 22 and 23, so that there is very little droop formed in the cables.

Although preferred embodiments of the invention have been disclosed in detail herein, it will be obvious to those skilled in the art that variations and modifications of the disclosed embodiments can be made without departing from the spirit and scope of the invention as set forth in the following claims.

What is claimed is:

1. A hitch ball coupler for connection to a ball hitch of a towing vehicle, comprising:
   an elongated cover that is inverted U-shape in cross section with a base wall and opposed parallel side walls for extending about a trailer hitch draw bar,
   retractable cable assemblies mounted to each said sidewall of said cover,
   each retractable cable assembly including:
      a housing,
      a spring mounted to said housing, and
      a safety cable having a proximal end operatively connected to said spring so said spring biases the cable into said housing, and a distal end extending away from said housing for connection to a towing vehicle,
   whereby the distal end of said safety cable can be extended away from its housing for connection to a towing vehicle or can be released from a towing vehicle and the cable retracted at least partially into said housing by the spring.

2. The hitch ball coupler of claim 1, wherein
   said housing comprises a tube that is mounted to a sidewall of said cover,
   said spring is mounted in said tube and is operable to bias said distal end of said cable toward said tube.

3. The hitch ball coupler of claim 1, wherein:
   said housing comprises a tube mounted to a sidewall of said cover,
   said spring is positioned in said tube,
   a spring anchor holding one end of said spring in said tube,
   said cable having its proximal end connected to the other end of said spring and its distal end movable from said tube to connect to a ball hitch of a towing vehicle.

4. The hitch ball coupler of claim 1, wherein:
   said elongated cover and said housing of each retractable cable assembly being formed of one piece of sheet metal.

5. The hitch ball coupler of claim 4, wherein:
   said housing of each retractable cable assembly being tubular,
   said spring being a coil compression spring positioned within said tubular housing,
   said proximal end of said cable extending telescopically through said spring, and
   said spring being compressible in response to said distal end of said cable being pulled away from said tubular housing.

6. A hitch ball coupler for connection to a ball hitch of a towing vehicle, comprising:
   a pair of retractable cable assemblies mounted on said hitch ball coupler, each said retractable cable assembly comprising:
      an elongate tubular housing,
      a coil compression spring positioned telescopically within said tubular housing, said spring having a first end anchored to said tubular housing and a second end,
      a safety cable having a proximal end extending into said tubular housing and telescopically through said first end of said coil compression spring and connected to said second end of said coil compression spring, and a distal end extending out of said tubular housing, a hook connected to said distal end of said cable and for connection to a towing vehicle, and said coil compression spring being operable to bias said cable into said housing in response to said cable being pulled outwardly from said housing.

7. The hitch ball coupler of claim 6, wherein:

said tubular housing has opposed parallel sidewalls with said sidewalls each having an edge portion, said edge portion of each said side wall being rolled into a substantially cylindrical shape to form said elongate tubular housings.

* * * * *